US012629619B2

(12) United States Patent
Chen et al.

(10) Patent No.: US 12,629,619 B2
(45) Date of Patent: May 19, 2026

(54) FILTER CAPABLE OF AUTOMATICALLY CUTTING OFF GAS FLOW

(71) Applicant: China University of Petroleum-Beijing, Beijing (CN)

(72) Inventors: Feng Chen, Beijing (CN); Jinjie Lu, Beijing (CN); Zhongli Ji, Beijing (CN); Cheng Chang, Beijing (CN); Zhen Liu, Beijing (CN); Xiaolin Wu, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 407 days.

(21) Appl. No.: 18/337,783

(22) Filed: Jun. 20, 2023

(65) Prior Publication Data

US 2023/0330573 A1      Oct. 19, 2023

Related U.S. Application Data

(63) Continuation of application No. PCT/CN2022/105170, filed on Jul. 12, 2022.

(30) Foreign Application Priority Data

Aug. 31, 2021      (CN) .......................... 202111012906.1

(51) Int. Cl.
B01D 35/15            (2006.01)
B01D 35/157           (2006.01)
(52) U.S. Cl.
CPC .... B01D 35/1573 (2013.01); B01D 2201/302 (2013.01); B01D 2201/306 (2013.01)
(58) Field of Classification Search
CPC .......... B01D 35/1573; B01D 2201/302; B01D 2201/306; B01D 46/0054; B01D 46/0087;
(Continued)

(56) References Cited

U.S. PATENT DOCUMENTS 5,774,056 A * 6/1998 Berry, III ............... F02M 35/09
                                                340/626
6,015,492 A * 1/2000 Popoff ................. B01D 36/003
                                                210/450

FOREIGN PATENT DOCUMENTS

CN          202376843 U      8/2012
CN          202620906 U  *  12/2012
            (Continued)

OTHER PUBLICATIONS

International search report issued for counterpart Chinese Patent Application No. PCT/CN2022/105170, dated Oct. 10, 2022.
(Continued)

*Primary Examiner* — Waqaas Ali
(74) *Attorney, Agent, or Firm* — LOZA & LOZA, LLP; Michael F. Fedrick

(57)                  ABSTRACT

A filter capable of automatically cutting off gas flow, including: a housing (1) with a cavity, a filter element (2) disposed in the cavity, a blocking mechanism disposed in the flow channel (13), and an unblocking member (23). The housing is provided with an inlet end (11) and an outlet end (12). The filter element (2) is provided with a first chamber (21). A second chamber (23) is formed between the filter element (2) and the housing (1), and a flow channel (13) is disposed between the first chamber (21) and the inlet end (11). The blocking mechanism has an unblocking state in which the blocking mechanism is cooperated with the unblocking member (23) to allow a gas flow to flow out of the flow channel (13), and a blocking state in which the blocking mechanism prevents the gas flow from flowing out of the flow channel (13).

8 Claims, 6 Drawing Sheets

(58) Field of Classification Search
CPC .... B01D 46/46; B01D 46/24; B01D 46/0084;
B01D 46/0041
See application file for complete search history.

(56) References Cited

FOREIGN PATENT DOCUMENTS

| | | | | |
|----|----------------|----|----|---------|
| CN | 203030110 | U | * | 7/2013 |
| CN | 106925014 | A | | 7/2017 |
| CN | 107875746 | A | | 4/2018 |
| CN | 207945029 | U | | 10/2018 |
| CN | 111298507 | A | | 6/2020 |
| CN | 111346427 | A | | 6/2020 |
| CN | 111643988 | A | | 9/2020 |
| CN | 113617137 | A | | 11/2021 |

OTHER PUBLICATIONS

First Office Action and Search Report issued on Apr. 1, 2022 for counterpart Chinese Patent Application No. 202111012906.1 with machine translation downloaded from the EPO.
Supplemental Search Report issued on Apr. 24, 2022 for counterpart Chinese Patent Application No. 202111012906.1 with machine translation.

* cited by examiner

Service life expires $L_1$  $L_s$  $L_2$

FILTER CAPABLE OF AUTOMATICALLY CUTTING OFF GAS FLOW

CROSS-REFERENCE TO RELATED APPLICATIONS

This application is a continuation of International al Application No. PCT/CN2022/105170, filed on Jul. 12, 2022, which claims priority to Chinese Invention patent Application No. 202111012906.1, filed on Aug. 31, 2021, and entitled 'dry gas seal filter capable of automatically cutting off gas flow', both of which are hereby incorporated by reference in their entireties.

FIELD

The present disclosure relates to the field of gas-liquid filtrations, and particularly to a filter capable of automatically cutting off gas flow.

BACKGROUND

The shaft-end sealing of the natural gas compressor unit is usually in the form of dry gas seal, which requires a high quality of dry gas, i.e., the dry gas should not contain liquid drops or solid particle impurities, otherwise a thermal strain failure of a seal ring will be caused. Therefore, a dry gas seal filter is required to filter out the liquid droplets or the solid particle impurities in the dry gas. However, when a filter element in the filter reaches a steady pressure drop, a re-entrainment will easily occur at the downstream, so it is necessary to replace the filter element in time.

In field application, whether the filter element should be replaced is usually judged according to a set replacement cycle. If the set replacement cycle is long, it will cause a re-entrainment in the downstream and increase the risk of filtration failure. If the set replacement cycle is short, the service life of the filter element will not be reached, which causes economic waste to a certain extent. In addition, during replacement of the filter element in the filter, the operator might forget to mount the filter element, resulting in that the gas in the downstream is polluted and the safe operation of the natural gas compressor unit is affected when a ventilation is continued without mounting the filter element.

For example, the prior art with a publication number of CN111298507A discloses a filter, in which a life prediction model for a filter element is established by disposing a differential pressure monitoring unit, a storage unit and a life prediction unit, but there is no measures to replace the filter element or stop the gas flow after the service life of the filter element expires, so the device only plays a prediction function. In addition, the device does not take into account the situation when the filter element is not mounted.

SUMMARY

In order to solve at least one technical problem in the prior art, the present disclosure provides a filter capable of automatically cutting off gas flow, and when a filter element is forgotten to be mounted, a gas flow cannot pass through the filter capable of automatically cutting off gas flow, thereby avoiding pollution of gas in the downstream when the filter element is not mounted.

In order to achieve the above objective, the technical solution adopted by the present disclosure is as follows.

A filter capable of automatically cutting off gas flow, including a housing with a cavity, a filter element disposed in the cavity, a blocking mechanism and an unblocking member. The housing is provided with an inlet end and an outlet end. The filter element is provided with a first chamber formed by being enclosed by a filter media. A second chamber communicated with the outlet end is formed between the filter element and the housing. A flow channel is disposed between the first chamber and the inlet end. The blocking mechanism is disposed in the flow channel. The filter element is provided with the unblocking member. The blocking mechanism has an unblocking state in which the blocking mechanism is cooperated with the unblocking member to allow a gas flow to flow out of the flow channel, and a blocking state in which the blocking mechanism prevents the gas flow from flowing out of the flow channel.

Compared with the prior art, the present disclosure has the following advantageous effects:

In the filter capable of automatically cutting off gas flow according to the embodiments of the present disclosure, a flow channel is disposed between the filter element and the inlet end of the filter capable of automatically cutting off gas flow, a blocking mechanism is disposed in the flow channel, and the filter element is provided with an unblocking member cooperated with the blocking mechanism. When the filter element is not mounted in the filter capable of automatically cutting off gas flow, the blocking mechanism loses the cooperated unblocking member, and the blocking mechanism is in a blocking state in which the blocking mechanism can prevent the gas flow from flowing out of the flow channel, thereby realizing the function of automatically cutting off the gas flow. When the filter element is mounted in the filter capable of automatically cutting off gas flow, the blocking mechanism is in an unblocking state in which the blocking mechanism is cooperated with the unblocking member to allow the gas flow to flow out of the flow channel, so that the filter capable of automatically cutting off gas flow can be used normally.

The filter of the present disclosure is applicable for filtration in dry gas seal or other fields where liquid droplets or solid particle impurities in gas need to be filtered out.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

Figure 1:
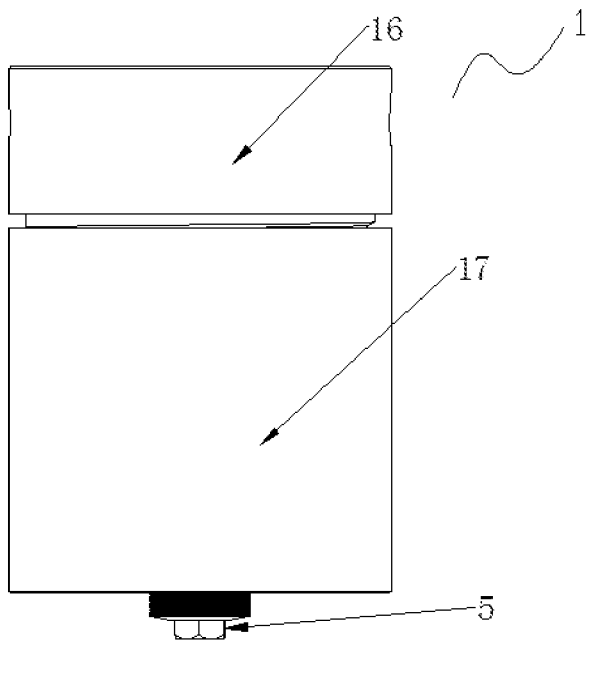
FIG. 1 illustrates an overall structural diagram of a filter capable of automatically cutting off gas flow according to an embodiment of the present disclosure from a first perspective.

Reference numerals used in the drawings and specification:

1: housing; 11: inlet end; 12: outlet end; 13: flow channel; 14: valve seat; 15: valve body; 16: end cap; 17: main body; 18: first mating portion; 2: filter element; 21: first chamber; 22: second chamber; 23: unblocking member; 24: second mating portion; 25: filter element support; 26: bottom cap; 3: sealing mechanism; 4: elastic member; 5: pressure regulating mechanism; 6: distance sensor.

DETAILED DESCRIPTION

For a further illustration of technical features adopted by the present disclosure to achieve the intended invention objective and effects thereof, specific embodiments, structures, features, and effects of the present disclosure are described in detail below with reference to the drawings and the exemplary embodiments.

The present disclosure provides a filter capable of automatically cutting off gas flow, which includes a housing 1 with a cavity, a filter element 2 disposed in the cavity, a blocking mechanism, and an unblocking member 23. The housing 1 has an inlet end 11 and an outlet end 12. The filter element is provided with a first chamber 21 formed by being enclosed by a filter media. A second chamber 22 communicated with the outlet end 12 is formed between the filter element 2 and the housing 1. A flow channel 13 is disposed between the first chamber 21 and the inlet end 11. The blocking mechanism is disposed in the flow channel 13. The filter element 2 is provided with the unblocking member 23. The blocking mechanism has an unblocking state in which the blocking mechanism is cooperated with the unblocking member 23 to allow a gas flow to flow out of the flow channel 13, and a blocking state in which the blocking mechanism prevents the gas flow from flowing out of the flow channel 13.

Figure 2:
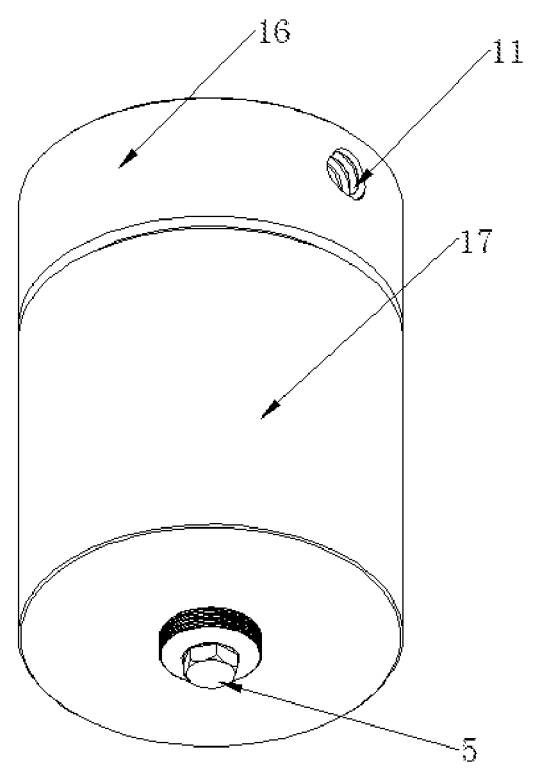
FIG. 2 illustrates an overall structural diagram of a filter capable of automatically cutting off gas flow according to an embodiment of the present disclosure from a second perspective.
Figure 3:
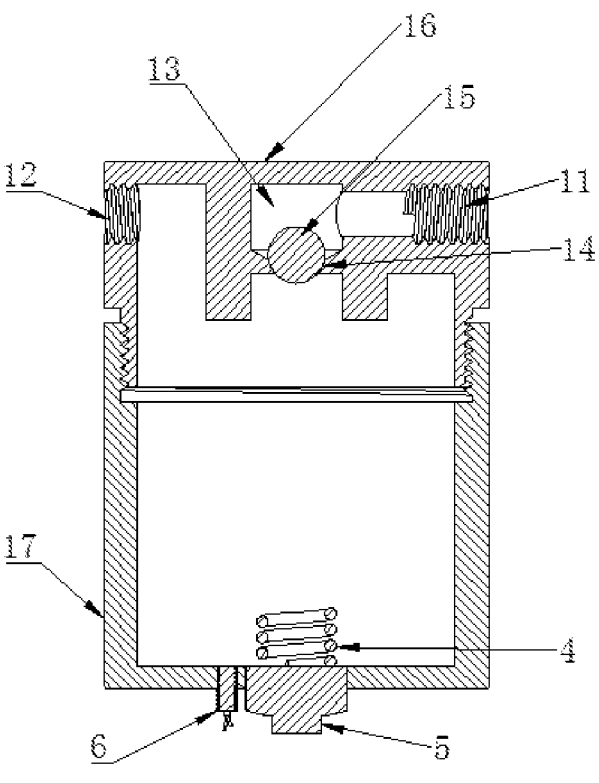
FIG. 3 illustrates a state diagram of a filter capable of automatically cutting off gas flow according to an embodiment of the present disclosure when a filter element is not mounted.

As illustrated in FIGS. 1 to 3, the housing 1 has a cavity for the placement of the filter element 2. In order to facilitate the placement of the filter element 2, the housing 1 has a main body 17 with an opening end, and an end cap 16 for enclosing the opening end. The housing 1 is provided with an inlet end 11 for introducing a gas flow, and an outlet end 12. The introduced gas flow is filtered by the filter element 2 and then flows out of the outlet end 12. The inlet end 11 and the outlet end 12 may both be disposed on the end cap

16 or the main body 17. Exemplarily, the inlet end 11 and the outlet end 12 are disposed on the end cap 16.

The filter element 2 includes a filter media and a filter element support 25 on which the filter media is disposed. The first chamber 21 communicated with the inlet end 11 is formed by being enclosed by the filter media. The filter media has a surface material with a small pore size, thereby capturing droplets and particles with small particle sizes carried in the gas, so that impurities in the gas can be captured by the surface of the filter media to form a dust layer. The filtered gas separated from the impurities passes through the filter media to the second chamber 22 between the housing 1 and the filter element 2, and flows out of the outlet end 12.

In order to introduce the gas from the inlet end 11 into the first chamber 21, a flow channel 13 is disposed between the inlet end 11 and the first chamber 21. Specifically, the end cap 16 may be provided with a flow-guiding mechanism in which the flow channel 13 is disposed. One end of the flow channel 13 is the inlet end 11, and the other end of the flow channel 13 is used to be connected to the filter element 2 to realize a communication with the first chamber 21.

The blocking mechanism is disposed in the flow channel 13, and the filter element 2 is provided with the unblocking member 23 cooperated with the blocking mechanism. The blocking mechanism has a blocking state and an unblocking state. When the blocking mechanism is in the unblocking state, the unblocking member 23 of the filter element 2 can cooperate with the blocking mechanism to keep the flow channel 13 in a through state, so as to allow the gas to flow out of the flow channel 13 into the first chamber 21. When the blocking mechanism is in the blocking state, the unblocking member 23 fails to cooperate with the blocking mechanism, so that the blocking mechanism is seated on the flow channel 13, thereby preventing the gas from flowing out of the flow channel 13.

When the blocking mechanism is in the blocking state, the filter element 2 is usually not mounted in the housing 1, resulting in that the blocking remover 23 cannot cooperate with the blocking mechanism; or the filter element 2 is mounted in the housing 1 but the unblocking member 23 fails to cooperate with the blocking mechanism, also resulting in that the blocking mechanism is in the blocking state. Therefore, when the filter element is forgotten to be mounted in the filter capable of automatically cutting off gas flow or the filter element is not mounted in place, the blocking mechanism is in the blocking state, resulting in that the gas cannot enter the housing 1 from the flow channel 13, and thus cannot flow out of the outlet end 12.

Figure 4:
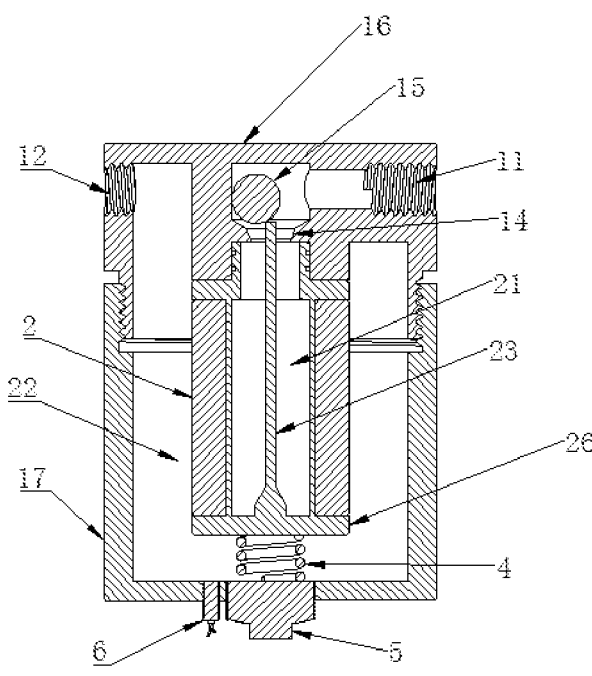
FIG. 4 illustrates a state diagram of a filter capable of automatically cutting off gas flow according to an embodiment of the present disclosure during normal use.
Figures 5, 6:
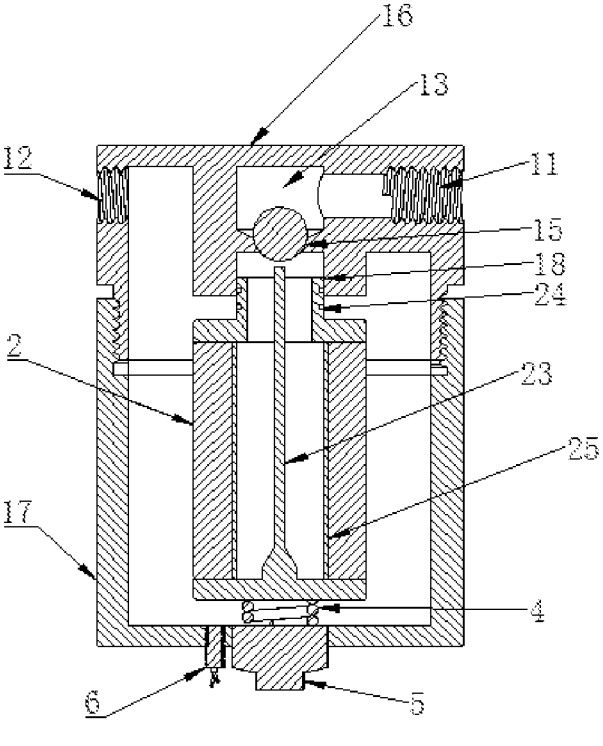
FIG. 5 illustrates a state diagram of a filter capable of automatically cutting off gas flow according to an embodiment of the present disclosure when a service life of a filter element expires.
FIG. 6 illustrates a state diagram of an initial height and a final height of an elastic member according to an embodiment of the present disclosure.

In an embodiment, as illustrated in FIGS. 4 and 5, the blocking mechanism includes a valve seat 14 disposed in the flow channel 13 and a valve body 15 cooperated with the valve seat 14. When the valve body 15 is seated on the valve seat 14, the blocking mechanism is in the blocking state, and when the valve body 15 is pushed away from the valve seat 14 by the unblocking member 23, the blocking mechanism is in the unblocking state.

Figure 9:
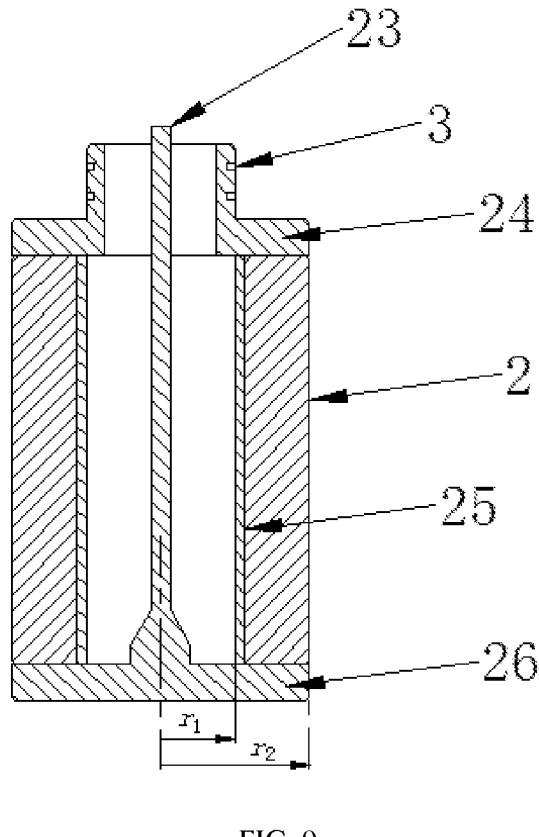
FIG. 9 illustrates a structural diagram of a filter element according to an embodiment of the present disclosure.

In this embodiment, as illustrated in FIG. 9, the unblocking member 23 may be mounted in the first chamber 21 and has a rod body extending longitudinally. The bottom of the filter element 2 is provided with a bottom cap 26, to which both the unblocking member 23 and the filter element support 25 are connected. When the filter element 2 is mounted in the housing 1, an upper end of the unblocking member 23 can jack up the valve body 15 in the flow channel 13 to keep a smooth gas flow in the flow channel 13. If the filter element 2 is not mounted in the housing 1, the unblocking member 23 also does not exist in the housing 1, and the valve body 15 is seated on the valve seat 14 by its own gravity. If the filter element 2 is not mounted in place, the upper end of the unblocking member 23 loses contact with the valve body 15, and the valve body 15 is seated on the valve seat 14 by its own gravity. Both of the above situations cause the gas flow in the flow channel 13 to be blocked.

In some possible embodiments, the blocking mechanism may include a valve plate and a spring that exerts a force on the valve plate. The valve plate is blocked at the end of the flow channel 13 under the thrust of the spring, so that the blocking mechanism is in the blocking state. When the valve plate is jacked up by the unblocking member 23, the flow channel 13 can be opened, so that the blocking mechanism is in the unblocking state.

Further, as illustrated in FIG. 5, the end cap 16 is provided with a first mating portion 18, on which the flow channel 13 is disposed. The filter element 2 is provided with a second mating portion 24 which is cooperated with the first mating portion 18. A sealing mechanism 3 is disposed between the first mating portion 18 and the second mating portion 24.

Specifically, the first mating portion 18 is configured to form a flow-guiding mechanism. The inlet end 11 extends into the first mating portion 18 to form the flow channel 13. The second mating portion 24 may be disposed at an upper end of the filter element support 25 and cooperated with the first mating portion 18 to realize a connection between the first chamber 21 of the filter element 2 and the flow channel 13. One of the first mating portion 18 and the second mating portion 24 may be a groove structure, and the other is a convex structure cooperated with the groove structure. By mating the first mating portion 18 with the second mating portion 24, the mounting of the filter element 2 to the end cap 16 is completed. In addition, in order to ensure the sealability of the mating portion, the sealing mechanism 3, which may be a multi-turn sealing ring, is disposed between the first mating portion 18 and the second mating portion 24.

In the present disclosure, as illustrated in FIGS. 4 and 5, the filter capable of automatically cutting off gas flow includes an elastic member 4 that exerts an elastic restoring force on the filter element 2, and the elastic restoring force exerted by the elastic member 4 on the filter element 2 can prevent the filter element 2 from moving downward relative to the blocking mechanism.

The gas containing impurities is subjected to a certain resistance when passing through the filter media, which is reflected in a filtration pressure drop of the filter element 2, i.e., the pressure of the gas before passing through the filter media is greater than the pressure of the gas after passing through the filter media. During the normal operation of the filter element 2, the gas carrying away the impurities continuously flows through the filter media, and the impurities captured by the filter media will continuously block the pores in the filter media, resulting in an increase of the resistance to the gas (i.e., the pressure difference between the two sides of the filter media increases, and the filtration pressure drop increases).

When the pores in the filter media are filled to a certain extent, the service life of the filter media expires, at which time the filter element needs to be replaced and the overall weight of the filter element 2 also increases. The increase of the weight of the filter element 2 leads to the increase of the stress imposed on the elastic element 4. When the pressure drop of the filter element 2 increases to a certain extent, the elastic restoring force exerted on the filter element 2 by the elastic element 4 cannot prevent the filter element 2 from moving downward relative to the blocking mechanism. As the filter element 2 descends, the unblocking member 23 of the filter element 2 descends, and when the service life of the filter element 2 expires, the unblocking member 23 of the filter element 2 descends to be unable to cooperate with the blocking mechanism, which causes the blocking mechanism to switch to the blocking state.

In this embodiment, the filter element 2 is vertically mounted in the housing 1, and the elastic restoring force exerted on the filter element 2 by the elastic member 4 can prevent the filter element 2 from moving downward relative to the blocking mechanism. At this time, the valve body 15 is pushed away from the valve seat 14 by the blocking removing member 23 to ensure that the flow channel 13 is open. When the service life of the filter media expires, the valve body 15 can naturally fall and sit on the valve seat 14, thereby ensuring that the gas flow will not leak or seep out of the flow channel 13. At this time, due to the high pressure at the inlet end 11, there is no pressure below the valve body 15, so that the valve body 15 is firmly fixed on the valve seat 14 by gas pressure, thereby realizing the function of automatically cutting off gas flow.

In an embodiment, the elastic element 4 is mounted between a bottom of the filter element 2 and a bottom of the housing 1, and the bottom of the housing 1 is provided with a pressure regulating mechanism 5 connected to the elastic element 4 for regulating a pre-tightening force of the elastic element 4.

Figure 7:
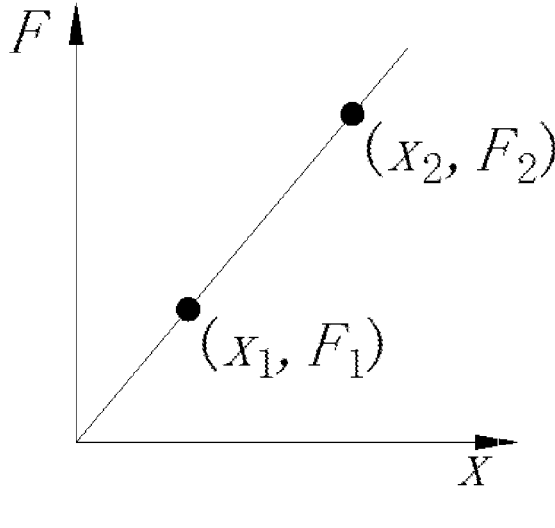
FIG. 7 illustrates a trend diagram of a strain change in an elastic member according to an embodiment of the present disclosure.

The two ends of the elastic member 4 are respectively connected to the filter element 2 and the housing 1. When the weight of the filter element 2 gradually increases, the elastic element 4 is stressed and deformed, with a decreased length in an axial direction of the housing 1, so that the deformation of the elastic element 4 can reflect the change in the pressure drop of the filter element 2, and further, reflect the service life of the filter element 2. As illustrated in FIGS. 6 and 7, when a clean filter element 2 is mounted in the housing 1, the deformation amount of the elastic element 4 is 0, and the elastic element 4 has an initial height in the axial direction of the housing 1. During the use of the filter element 2, the weight of the filter element 2 increases with the accumulation of the impurities in the filter element 2. When the service life of the filter element 2 expires, the length of the elastic element 4 in the axial direction of the housing 1 is decreased by $L_S$, and the final height of the elastic element 4 is $L_2$. Further, as illustrated in FIGS. 1 and 2, the bottom of the housing 1 is provided with a pressure regulating mechanism 5, which may be an adjusting nut to adjust the pre-tightening force of the elastic member 4 by being screwed in and out at the bottom of the housing 1.

Alternatively, in some possible embodiments, the elastic member 4 provides a tensile force to the filter element 2. Different from the previous embodiment, when the weight of the filter element 2 gradually increases, the elastic element 4 bears the tensile force, and is deformed with an increased length in the axial direction of the housing 1, so that the deformation of the elastic element 4 can reflect the change in the pressure drop of the filter element 2, and further, reflect the service life of the filter element 2.

In the present disclosure, the filter capable of automatically cutting off gas flow includes a distance sensor 6 disposed on the bottom of the housing 1 to detect a change in the height of the elastic member 4 in the axial direction of the housing 1.

In the present disclosure, a relationship between a final deformation amount of the elastic element 4 and a pressure drop of the filter element 2 satisfies the following formula:

$$L_s = \frac{\pi \Delta p_s}{k}\left[r_1^2 + \frac{2}{r_1 - r_2}\left(\frac{r_2^3 - r_1^3}{3} - \frac{r_2^2 - r_1^2}{2}\right)\right];$$

where $L_S$ represents a final deformation amount of the elastic member 4, in unit of mm; $\Delta p_s$ represents a pressure drop of filter element 2, in unit of Pa; k represents an elastic coefficient; $r_1$ represents a radius of the first chamber 21, in unit of mm; and $r_2$ represents a radius of the filter element 2.

Figure 10:
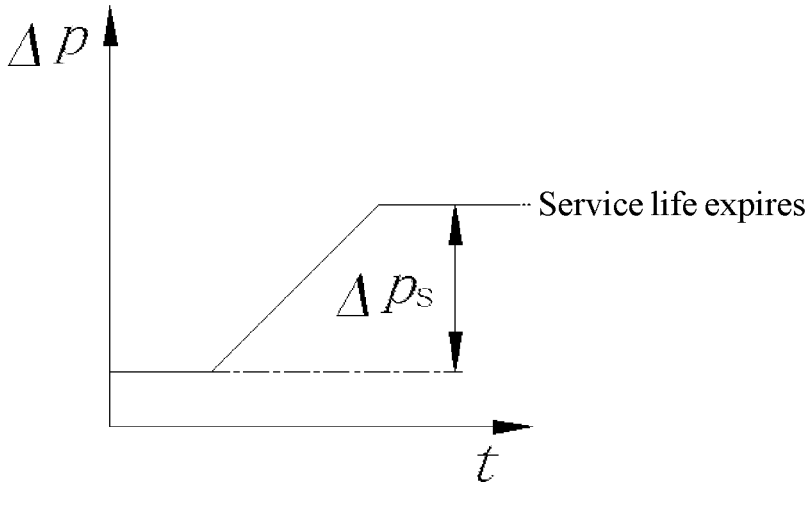
FIG. 10 illustrates a change trend diagram of a pressure drop of a filter element over time according to an embodiment of the present disclosure.

As described above, during the normal operation of the filter element 2, the gas carrying away the impurities continuously flows through the filter media, and the impurities captured by the filter media will continuously block the pores in the filter media, resulting in an increase of the resistance to the gas. When the pores in the filter media are filled to a certain extent, the service life of the filter media expires and the filter element needs to be replaced, as illustrated in FIG. 10, and the corresponding filtration pressure drop is $\Delta p$ at this time, i.e., $\Delta p_s$ may be used to judge that the service life expires, where $\Delta p$ may be represented by a pressure difference between the first chamber 21 and the second chamber 22.

As shown in the following equations:

when $\Delta p < \Delta p_s$, the service life does not expire;

when $\Delta p = \Delta p_s$, the service life expires;

when $\Delta p > \Delta p_s$, the filter automatically cuts off the gas flow;

where when $\Delta p < \Delta p_s$, the service life of the filter element 2 does not expire, the filter element 2 does descend to a position where the unblocking member 23 is separated from the valve body 15, and the flow channel 13 is still kept open. When $\Delta p = \Delta p_s$, the service life of the filter element 2 just expires as illustrated in FIG. 5, the filter element 2 descends to the position where the unblocking member 23 is separated from the valve body 15, and the valve body 15 is seated on the valve seat 14, so that the flow channel 13 is blocked. Thus, when $\Delta p > \Delta p_s$, the flow channel 13 is in a blocked state, and the filter capable of automatically cutting off gas flow can automatically cut off the gas flow.

Therefore, when the filter is designed, it is necessary to consider the relationship between the final deformation amount $L_S$ of the elastic member 4 and the service life $\Delta p_s$ of the filter element. As can be seen from FIGS. 6 and 8, a pressure F' acting on the bottom cap 26 within a radius $0 \sim r_1$ of the first chamber 21 is directed vertically downward with a value of:

$$F' = (p_1 - p_2)\pi r_1^2 \qquad (1\text{-}1)$$

Figure 8:
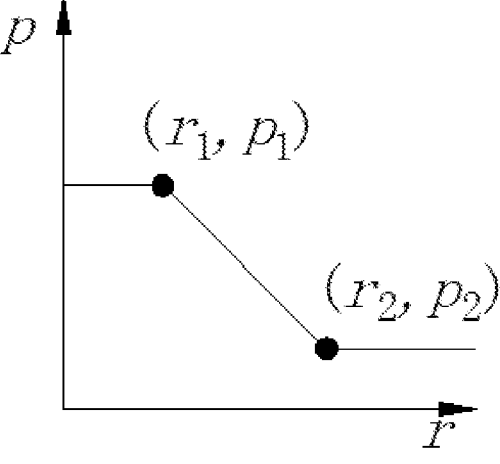
FIG. 8 illustrates a trend diagram of a gas pressure change in a radial direction of a bottom cap of a filter element according to an embodiment of the present disclosure.

$p_1\text{-}p_2$ represents a pressure difference between the first chamber 21 and the second chamber 22. In addition, the pressure intensity acting on the bottom cap 26 within a radius $r_1 \sim r_2$ decreases as the radius increases, as shown in FIG. 8, and is expressed by equation (1-2).

$$\begin{cases} p = p_1, & r < r_1 \\ p = \frac{p_1 - p_2}{r_1 - r_2}(r - r_1) + p_1, & r_1 < r < r_2 \\ p = p_2, & r_2 < r \end{cases} \qquad (1\text{-}2)$$

Thus, a pressure F" acting on the bottom cap 26 within a radius $r_1 \sim r_2$ is directed vertically downward with a value of:

$$F'' = \int_{r_1}^{r_2} 2\pi r(p - p_1)dr = \frac{2\pi(p_1 - p_2)}{r_1 - r_2}\left[\frac{r_2^3 - r_1^3}{3} - \frac{r_2^2 - r_1^2}{2}\right] \qquad (1\text{-}3)$$

Thus, a total pressure F acting on the bottom cap 26 is directed vertically downward with a value of:

$$F = F' + F'' = \pi(p_1 - p_2)\left[r_1^2 + \frac{2}{r_1 - r_2}\left(\frac{r_2^3 - r_1^3}{3} - \frac{r_2^2 - r_1^2}{2}\right)\right] \qquad (1\text{-}4)$$

As can be seen from FIG. 7, the elastic member 4 follows Hooke's law, with an elastic coefficient of k. When the service life of the filter element 2 expires, the elastic element 4 is compressed, and a compression distance x is the descending height of the unblocking member 23, with a value of:

$$x = \frac{F}{k} = \frac{\pi(p_1 - p_2)}{k}\left[r_1^2 + \frac{2}{r_1 - r_2}\left(\frac{r_2^3 - r_1^3}{3} - \frac{r_2^2 - r_1^2}{2}\right)\right] \qquad (1\text{-}5)$$

The relationship between the final deformation amount $L_S$ of the elastic member 4 and the service life $\Delta p_s$ of the filter element is:

$$L_s = \frac{\pi \Delta p_s}{k}\left[r_1^2 + \frac{2}{r_1 - r_2}\left(\frac{r_2^3 - r_1^3}{3} - \frac{r_2^2 - r_1^2}{2}\right)\right] \qquad (1\text{-}6)$$

In the present disclosure, the relationship between the remaining life of the filter element 2 and the length of the elastic element 4 satisfies the following formula:

$$\text{remaining life} = \frac{\pi \Delta p_s}{k}\left[r_1^2 + \frac{2}{r_1 - r_2}\left(\frac{r_2^3 - r_1^3}{3} - \frac{r_2^2 - r_1^2}{2}\right)\right] - (L_1 - L);$$

where $\Delta p_s$ represents a pressure drop of the filter element 2, in unit of Pa; k represents an elastic coefficient; $r_1$ represents a radius of the first chamber 21, in unit of mm; $r_2$ represents a radius of the filter element 2; $L_1$ represents an initial height of the elastic member 4 in an axial direction of the housing 1, in unit of mm; and L represents a current height of the elastic member 4 in the axial direction of the housing 1.

Generally, the filter elements 2 of the same model have a fixed service life, i.e., $\Delta p_s$ is a fixed value. The filter media needs to be replaced when the pressure drop thereof reaches a certain level. At present, whether the filter element 2 needs to be replaced is usually judged based on the service time, and a replacement is made when a certain service time is reached. This process is not accurate enough to judge the service life of the filter element 2.

In the present disclosure, the distance sensor 6 is disposed at the bottom of the housing 1 of the filter capable of automatically cutting off gas flow to detect the change in L of the elastic member 4 in the axial direction of the housing 1. Since the upper end of the elastic member 4 is connected to the bottom cap 26, Z also represents a vertical distance between a bottom surface of the bottom cap 26 and the bottom of the housing 1. As illustrated in FIG. 6 for $L_1$ and $L_2$:

when $L_1-L<L_S$, the service life does not expire;

when $L_1-L=L_S$, the service life expires, and at this time $L=L_2$;

when $L_1-L>L_S$, the filter automatically cuts off the gas flow.

Figure 11:
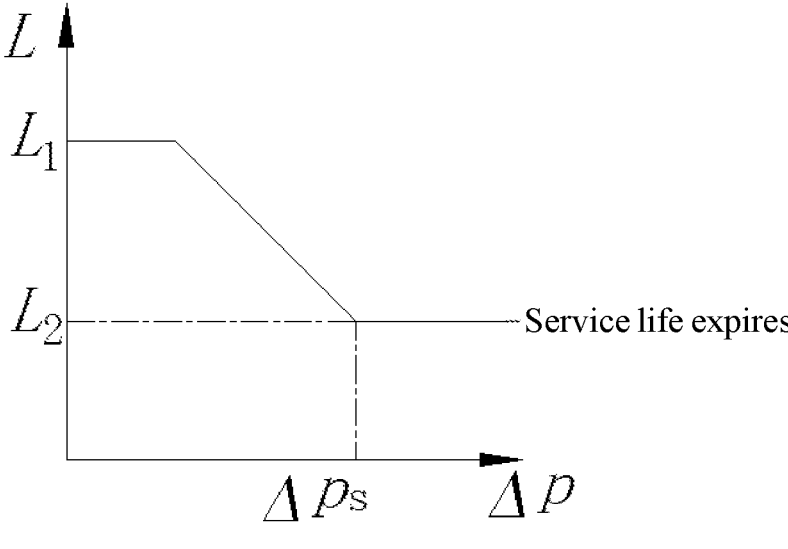
FIG. 11 illustrates a schematic diagram of a relationship between a service life of a filter element and a height of an elastic element in an axial direction of a housing according to an embodiment of the present disclosure.

The detection process is as follows: when a clean filter element 2 is placed in the housing 1, the deformation amount of the elastic element 4 is 0, and at this time, the distance detected by the distance sensor 6 is a maximum distance $L_1$. During use, the filter element 2 moves downward with the gradual increase of the process pressure drop. When the service life of the filter element 2 expires, the deformation amount of the elastic element 4 is $L_S$, and at this time, the distance detected by the distance sensor 6 is a minimum distance $L_2$. The output signal of the distance sensor 6 has an analog quantity of 0 mA to 20 mA, where 0 mA and 20 mA are corresponding to $L_2$ and $L_1$, respectively. FIG. 11 illustrates the relationship between the process pressure drop and the distance L, and the remaining life is $L_S-(L_1-L)$, i.e., $$\text{remaining life} = \frac{\pi \Delta p_s}{k}\left[r_1^2 + \frac{2}{r_1-r_2}\left(\frac{r_2^3-r_1^3}{3}-\frac{r_2^2-r_1^2}{2}\right)\right]-(L_1-L) \quad (1\text{-}7)$$

In the present disclosure, the first mating portion 18 is a limiting groove, the second mating portion 24 is a convex portion, the sealing mechanism 3 is a sealing ring disposed between the limiting groove and the convex portion, and the final deformation amount of the elastic member 4 is less than the length of the limiting groove. Thus, considering that the pressure fluctuation at the inlet end 11 during filtration may cause the filter element 2 to suddenly move downward in a short time, it is necessary to ensure that the length of the limiting groove is greater than the final deformation amount $L_s$ of the elastic element 4. That is, the length of the limiting groove is larger than the descending length of the unblocking member 23, so as to ensure the sealability between the first chamber 21 and the flow channel 13 when the filter element 2 is mounted.

The filter capable of automatically cutting off gas flow according to the embodiments of the present disclosure has the following advantages:

1. When the filter element is forgotten to be mounted in the filter, the gas flow cannot pass through the filter, thereby reducing the damage to the compressor unit when the filter element is forgotten to be mounted during the manual replacement.

2. When the service life of the filter element expires, it is possible to automatically prevent the gas flow from passing through the filter without external assistance (e.g., monitoring by surveillance and sensing devices, and making a manual replacement). Therefore, the filter can automatically cut off the gas flow without manual intervention or external power supply.

3. The filter can detect the service life of the filter element through the distance sensor, and realize the remote transmission of signals for a station control system to query and monitor. Therefore, the filter can detect the remaining life of the filter element in real time, and by setting a remaining life alarm value, it is possible to remind the station staff to prepare for replacing the filter element.

Those described above are just preferred embodiments of the present disclosure, and are not intended to limit the protection scope of the present disclosure. Any non-substantive change or substitution made by persons skilled in the art based on the present disclosure should fall within the protection scope of the present disclosure.

What is claimed is:

1. A filter capable of automatically cutting off gas flow, comprising:

a housing with a cavity, the housing being provided with an inlet end and an outlet end;

a filter element disposed in the cavity, wherein the filter element is provided with a first chamber formed by being enclosed by a filter media, a second chamber communicated with the outlet end is formed between the filter element and the housing, and a flow channel is disposed between the first chamber and the inlet end; and a blocking mechanism disposed in the flow channel;

wherein the filter element is provided with an unblocking member, and the blocking mechanism has an unblocking state in which the blocking mechanism is cooperated with the unblocking member to allow a gas flow to flow out of the flow channel, and a blocking state in which the blocking mechanism prevents the gas flow from flowing out of the flow channel;

wherein the filter comprises an elastic member that exerts an elastic restoring force on the filter element, wherein the elastic restoring force exerted by the elastic member on the filter element is capable of preventing the filter element from moving downward relative to the blocking mechanism; and wherein a relationship between a final deformation amount of the elastic member and a pressure drop of the filter element satisfies the following formula:

$$L_s = \frac{\pi \Delta p_s}{k}\left[r_1^2 + \frac{2}{r_1-r_2}\left(\frac{r_2^3-r_1^3}{3}-\frac{r_2^2-r_1^2}{2}\right)\right],$$

where $L_s$ represents a final deformation amount of the elastic member, in unit of mm; $\Delta p_s$ represents a pressure drop of filter element, in unit of Pa; k represents an elastic coefficient; $r_1$ represents a radius of the first chamber, in unit of mm; and $r_2$ represents a radius of the filter element.

2. The filter capable of automatically cutting off gas flow according to claim 1, wherein the blocking mechanism comprises a valve seat disposed in the flow channel and a valve body cooperated with the valve seat, and wherein:

when the valve body is seated on the valve seat, the blocking mechanism is in the blocking state, and when the valve body is pushed away from the valve seat by the unblocking member, the blocking mechanism is in the unblocking state.

3. The filter capable of automatically cutting off gas flow according to claim 1, wherein the housing comprises a main body with an opening end and an end cap for enclosing the opening end, and wherein:

the inlet end and the outlet end are both disposed on the end cap, the end cap is provided with a first mating portion on which the flow channel is disposed, the filter element is provided with a second mating portion which is cooperated with the first mating portion, and a sealing mechanism is disposed between the first mating portion and the second mating portion.

4. The filter capable of automatically cutting off gas flow according to claim 3, wherein the filter element comprises a filter element support for holding the filter media and a bottom cap connected to the unblocking member, and wherein a lower end of the filter element support is mounted on the bottom cap.

5. The filter capable of automatically cutting off gas flow according to claim 1, wherein the elastic element is mounted between a bottom of the filter element and a bottom of the housing, and wherein the bottom of the housing is provided with a pressure regulating mechanism connected to the elastic element for regulating a pre-tightening force of the elastic element.

6. The filter capable of automatically cutting off gas flow according to claim 5, comprising a distance sensor provided on the bottom of the housing.

7. The filter capable of automatically cutting off gas flow according to claim 6, wherein a relationship between a remaining life of the filter element and a length of the elastic member satisfies the following formula:

$$\text{remaining life} = \frac{\pi \Delta p_s}{k}\left[r_1^2 + \frac{2}{r_1 - r_2}\left(\frac{r_2^3 - r_1^3}{3} - \frac{r_2^2 - r_1^2}{2}\right)\right] - (L_1 - L);$$

where $\Delta p_s$ represents a pressure drop of the filter element, in unit of Pa; k represents an elastic coefficient; $r_1$ represents a radius of the first chamber, in unit of mm; $r_2$ represents a radius of the filter element; $L_1$ represents an initial height of the elastic member in an axial direction of the housing, in unit of mm; and L represents a current height of the elastic member in the axial direction of the housing.

8. The filter capable of automatically cutting off gas flow according to claim 3, wherein the first mating portion is a limiting groove, the second mating portion is a convex portion, the sealing mechanism is a sealing ring disposed between the limiting groove and the convex portion, and the final deformation amount of the elastic member is less than a length of the limiting groove.

* * * * *